United States Patent [19]

McClain et al.

[11] 4,007,329

[45] Feb. 8, 1977

[54] DATA COMMUNICATIONS SYSTEM WITH IMPROVED ASYNCHRONOUS RETIMING CIRCUIT

[75] Inventors: Herbert D. McClain, Quaker City; Bipin D. Parikh; John K. Burkey, both of Cambridge, all of Ohio

[73] Assignee: NCR Corporation, Dayton, Ohio

[22] Filed: Feb. 12, 1976

[21] Appl. No.: 657,426

[52] U.S. Cl. .......................... 178/69.1; 178/70 R; 328/155

[51] Int. Cl.² ........................................ H04L 7/00

[58] Field of Search .......... 325/13; 178/53, 69.5 R, 178/70 R; 179/15 BS; 328/63, 72, 133, 155; 340/146.1 D, 147 SY; 329/122

[56] References Cited

UNITED STATES PATENTS

| 3,760,111 | 9/1973 | Sawai | 178/70 R |
| 3,946,323 | 3/1976 | Bjerede | 328/155 |
| 3,959,601 | 5/1976 | Olevsky | 178/69.5 R |

*Primary Examiner*—Benedict V. Safourek
*Attorney, Agent, or Firm*—J. T. Cavender; Wilbert Hawk, Jr.; Jeffrey P. Morris

[57] ABSTRACT

A data communication system for asynchronously transmitting intermittently generated digitally encoded data between a data processor and a plurality of data terminals associated therewith is disclosed wherein the allowable communications line distance between the data processor and the terminals is substantially increased. Asynchronous data from the terminals is intercepted by a novel repeater, retimed in accordance with a newly generated retiming clock to eliminate bit-shift or other errors from the data, and retransmitted to the central processor over an extended length transmission line, with the repeater being substantially transparent to the flow of data. Decoding of an appropriate code by the repeater which is indicative of the receipt of a data character causes the switching from a data derived clock to a retiming clock for reencoding and retransmission of the data.

40 Claims, 23 Drawing Figures

DATA COMMUNICATIONS SYSTEM WITH IMPROVED ASYNCHRONOUS RETIMING CIRCUIT

CROSS-REFERENCE TO RELATED APPLICATIONS

The present invention references and relates to an application entitled Data Communications System With Improved Digital Phase-Locked Loop Retiming Circuit, Ser. No. 657,425, filed on even date herewith of H. D. McClain, B. D. Parikh and J. K. Burkey, and assigned to the same assignee as the present invention.

BACKGROUND OF THE INVENTION

1. Field of the Invention

The present invention relates generally to the transmission and synchronization of asynchronous digitally encoded data between a central processor and a plurality of terminals or other computer and associated peripheral equipment for utilizing or operating with such transmitted data. More specifically, the invention relates to a system for extending the allowable transmission line length between a computer and its associated terminal devices beyond the length possible with systems of the prior art.

When digitally encoded data, in whatever format, such as phase encoded, sometimes referred to as Manchester encoding, NRZ, or other known code is transmitted over a transmission line, the phase error, which is sometimes referred to as "bit-shift" or peak shift, between the data transitions and the system clock increases with increasing transmission line distance until the phase shift error results in loss of synchronization between clock and data, and errors in the transmitted data when decoded. The present invention relates to a technique for retiming the data at some point or points along the transmission line with a newly generated retiming clock gated on by the recognition of the incoming data, and retransmitting the retimed data along the transmission line, thereby extending the transmission line distance possible between a central processor and its terminals by substantially reducing the phase shift errors which would otherwise occur in transmission.

An exemplary application for such a retiming system is a central processor to which data is coupled from a plurality of electronic cash registers, as, for example in a department store.

2. Description of the Prior Art

Many communications systems are known in the prior art for transmitting digital data serially, in parallel, synchronously and asynchronously between a computer and its associated peripheral equipment. While such data may usually be synchronously transmitted from the computer to the peripheral equipment, data from the peripherals, in multi-byte format, is generally asynchronously transmitted to the computer, since the time of origin of such data is usually randon and intermittent. The present invention relates to an improved data transmission system for retiming and retransmitting such asynchronous data.

A typical communication system of the prior art illustrative of synchronous data communication between a central computer and its data terminals is disclosed by U.S. Pat. No. 3,676,846. A plurality of repeaters inserted in a transmission line for transmitting pulsed information is disclosed by U.S. Pat. No. 3,072,744. Another repeater technique for a bidirectional communication system is disclosed by U.S. Pat. No. 3,040,130. A serial loop data transmission system is disclosed by U.S. Pat. No. 3,633,166. A multi-clock timing control for a multiprocessor system is disclosed by U.S. Pat. No. 3,715,729. None of the above-identified prior art patents utilize the present retiming technique of retiming asynchronous data character by character by switching from data self-clocking to a retiming clock as each character is detected to enable character synchronous transmission and transmission line extension, which constitutes an improvement over such prior art techniques.

SUMMARY OF THE INVENTION

The present invention relates to an improved asynchronous data communications system including a novel bit-timing recovery technique for extending the allowable transmission line distance between a computer or data processor and another computer or data terminals, over which transmission line data is transmitted. One or more novel repeaters may be inserted in the line. In one embodiment of the invention, incoming digitally encoded data is detected, decoded, retimed, and re-encoded in accordance with a newly generated retiming clock to remove bit-shift or other errors, and retransmitted along the transmission line. In another embodiment, incoming data is detected by the detection of a start-bit, retimed in accordance with a newly generated retiming clock, and retransmitted along the transmission line. In both embodiments, the inserted repeater is transparent to the data and particularly suitable for the transmission of intermittently generated asynchronous data from a plurality of peripherals to a central computer.

It is accordingly an object of the invention to provide an improved data communication system for the transmission of digitally encoded data between a computer and its associated data terminal devices.

It is another object of the invention to provide an improved data transmission system for increasing the allowable transmission line length over which digitally encoded data may be effectively transmitted from a data processor to another data processor or terminal or from a plurality of terminals to a data processor.

It is yet another object of the present invention to provide a repeater for insertion in the path of transmission between a plurality of data terminals and a data processor thereby increasing the allowable distance over which such data may be transmitted.

It is yet another object of the present invention to provide a timing recovery circuit for retiming asynchronous digital data with a retiming clock and for coupling such retimed data from a plurality of data terminals to a data processor.

It is yet another object of the present invention to provide an improved digital modem for correcting bit-shift errors which may occur in asynchronous data during transmission of such data in a communications channel.

The aforementioned and other objects, features and advantages of the invention will be apparent with reference to the following detailed description of the preferred embodiments thereof, taken in connection with the accompanying drawings wherein:

DESCRIPTION OF THE PREFERRED EMBODIMENTS

Figure 1:
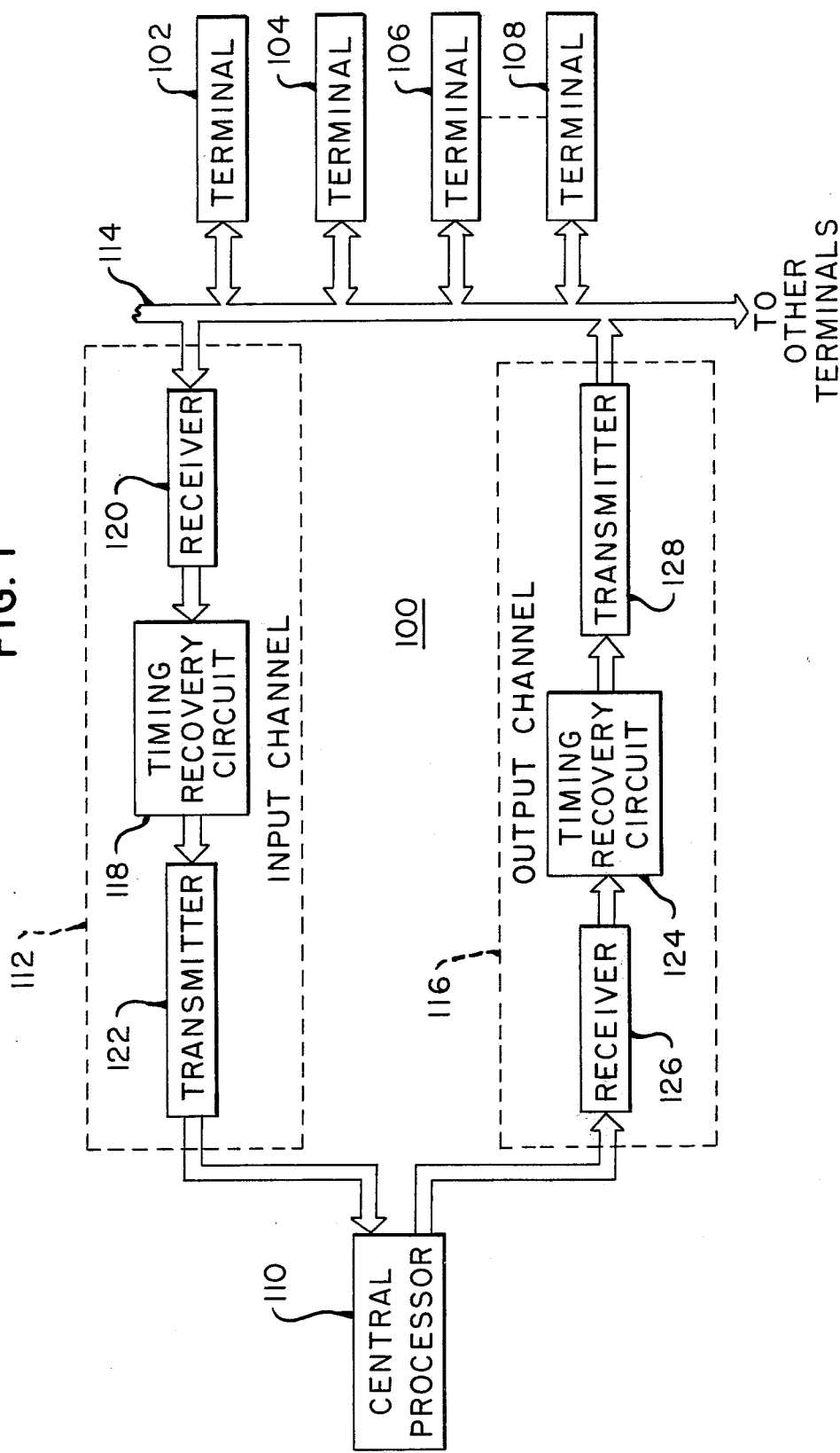
FIG. 1 is a simplified block diagram of a data communications system embodying the asynchronous timing recovery technique of the present invention.

Referring now to FIG. 1, a simplified block diagram of a communications channel illustrative of a typical multi-terminal configuration in which the present invention is utilized is shown generally at 100. A plurality of data terminals 102, 104, 106 and 108, at a plurality of spaced locations remote from a central processor 110, may comprise electronic cash registers, electronic funds transfer equipment, or any peripheral equipment capable of generating digital terminal to processor messages and of receiving processor to terminal messages over a communication line. In accordance with the present invention, the allowable data communication line distance between the terminals 102 through 108 and the central processor 110 is extended beyond the distance of such data communication lines of the prior art, for example, beyond 1500 feet, without loss of data, excess noise, loss of system timing, bit-shift or other transmission line anomalies. The central processor 110 may comprise NCR 751-600 Data Concentrator or other computer, while the number of terminal or peripheral locations is illustrative only, as any number of terminals may be coupled, in either a polling or common bus configuration to the central processor, dependent only upon the system software. An asynchronous input channel 112 relays data originating intermittently at the various terminal locations and coupled from a common bus 114 to the central processor, after retiming; while a synchronous output channel 116 relays data originating at the central processor 110 to the terminals, also after retiming. Each channel includes a timing recovery circuit for retiming the data coupled thereto and retransmitting the data to either the central processor 110 or to a designated terminal. The timing recovery circuits function as repeaters, which are transparent to the data flow, and receive, asynchronously in the input channel and synchronously in the output channel at a predetermined rate, of, for example, 1.25 megabits per second. The timing recovery circuit described with reference to the output channel 116, which includes a synchronous digital phase-locked loop repeater timing recovery circuit 124 and its associated receiver 126 and transmitter 128 is the subject of copending U.S. Pat. application Ser. No. 657,425, wherein the details thereof are disclosed. Generally, the output channel 116 continuously synchronously receives, retimes and retransmits phase encoded (Manchester) or other digitally encoded data to the data terminals from the central processor. For purposes of the present invention, output channel 116 completes the data transmission loop between the central processor 110 and its associated terminal devices.

The input channel 112, embodying the present invention, receives, retimes and retransmits 40-bit Manchester (phase) encoded characters (including preamble and sync character) asynchronously at 40–100 microsecond intervals at 1.25 megabit/second over a twisted-pair communication cable at an error rate of less than one bit per $10^9$ bits transmitted. Of course, other character word lengths and timing intervals may be employed; however, the above are character formats of the type which are typically used in commercial environments.

Figure 2:
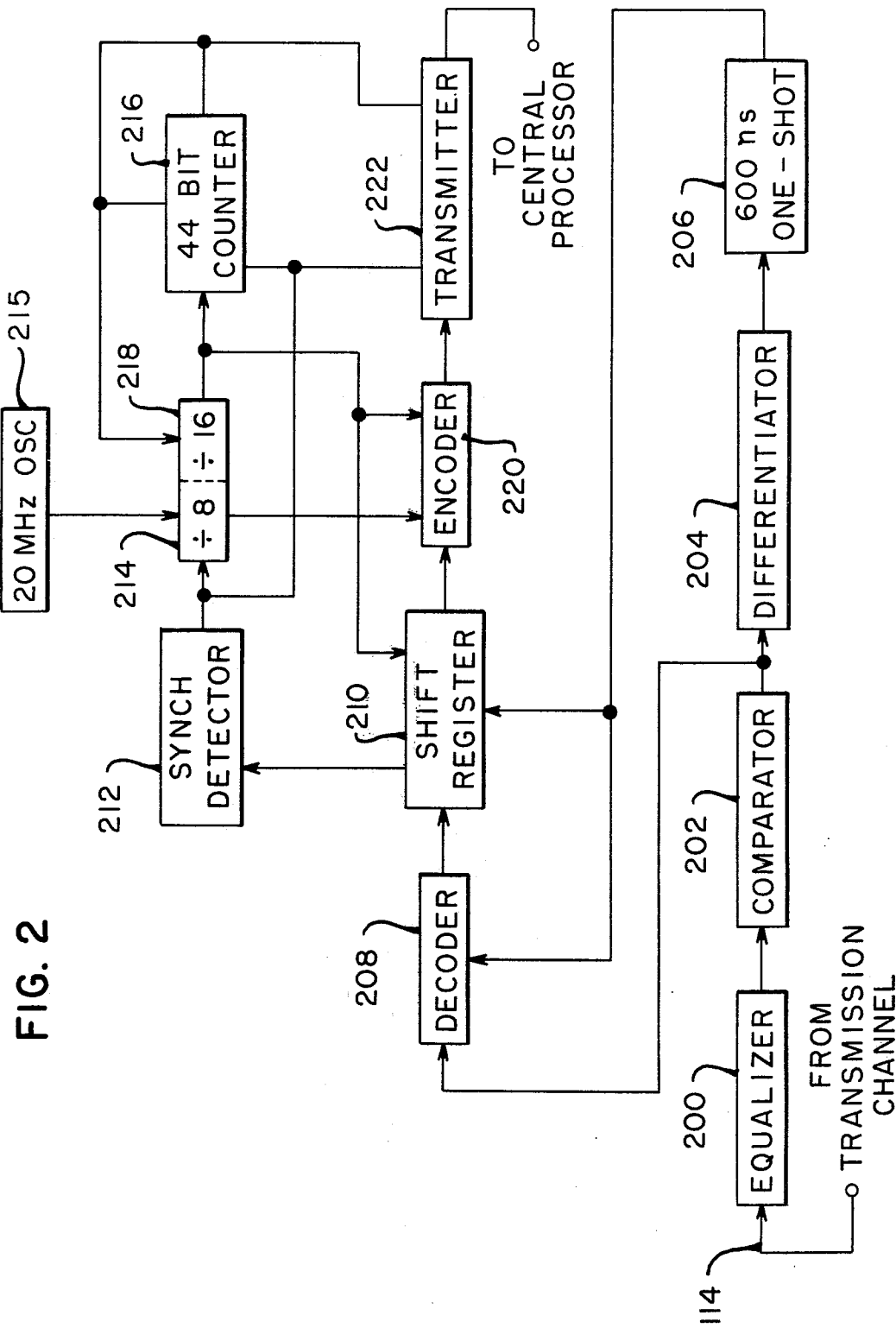
FIG. 2 is a block diagram of one embodiment of the bit-timing recovery and synchronization circuit of the present invention.

Referring now to FIG. 2, the retiming circuit interposed in the transmission line between a plurality of terminals and a data processor for coupling asynchronous data therebetween is illustrated. Data at a suitable transmission frequency, such as 1.25 megahertz from the data terminals is coupled via transmission line 114 or other communications channel via receiver 120, which has internal terminations to match the characteristic impedance of the transmission line, to an amplitude equalizer circuit 200, described in greater detail with reference to FIG. 4. The received data, digitally phase encoded, for example, in well known Manchester format, may comprise a stream of 40-bit characters of thirty-two microsecond duration at forty to 100 microsecond intervals, asynchronously. Such a data format is also sometimes referred to as "start/stop character synchronous". The amplitude equalizer 200 compensates for the frequency attenuation characteristics of a nominal transmission line and includes a low-pass filter for reducing high frequency out-of-band noise. The equalized amplitude data is coupled to a differential comparator 202 which comprises a zero-crossing detector having a zero volt reference level and an output which switches when the bi-polar input signal from equalizer 200 passes within several millivolts of the zero reference. The comparator input is preferably biased to compensate for any dissymmetry between the comparator output and the TTL circuitry to which the output is coupled, and to provide an offset threshold for immunity against background noise.

Operationally, the timing recovery technique comprises: decoding the incoming data signal, detecting a preamble and a synchronization character of a predetermined number of data bits, dividing the local oscillator down for use in retiming the data with a newly generated retiming clock, re-encoding the data with the new retiming clock once the sync character is decoded and retransmitting the retimed data with the retiming clock.

The output of comparator 202 is differentiated by differentiator 204, the output of which differentiator comprises one-shot triggering pulses coincident with the zero-crossings for triggering a digitally implemented non-retriggerable one-shot 206, having a three-quarter bit (600 nano-second) period, which pulse duration is sufficient to blank out the insignificant transitions of the Manchester encoded data.

The data output of comparator 202 is decoded by decoder 208 by sampling the comparator output with the leading edge of the output pulses from digital one-shot 206. Decoded data is clocked from decoder 208 into a sixteen-bit shift register 210, with the digital one-shot 206 output providing the data clock-ing signal. Shift register 210 generates a count-enable signal when 12 bits of information are clocked therein, such that the 12 bits comprise four-bits of preamble and an eight-bit synch character. The preamble may consist of an "all ones" code or, alternatively, an "all zeros" code, while the synch character may comprise an alternating 01010101 signal. When the preamble and synch character are detected, the count-enable signal is generated from divider network 218. The data in the shift register 210 is thus examined to determine the presence of a valid synch character. Once enabled, synch detector 212 both indicates the presence of a synch character and enables the transmitter as follows. The 20 MHz local oscillator 215 is divided by a divide-by-eight circuit 214 down to 2.5 MHz, after being initated by the count enable signal coupled thereto after generation by divider 218 after setting of the count enable flip-flop in response to detection of a synch character by synch detector 212. The count enable signal is also coupled to a 44-bit counter 216, which counts 44 bits and then clamps the transmitter off. Since the characters are less than 44 bits in length, the 44-bit counter is adequate to assure retransmission of complete characters. The count enable signal is additionally employed to actuate a further frequency division circuit 218 (divide-by-two) to provide a divide-by-sixteen frequency division to 1.25 MHz as the re-encoding clock in conjunction with divide-by-eight circuit 214 for retiming the encoded data at encoder 220. Effectively, this switches the shift register clocking from the leading edge of digital one-shot 206 to the divide-by-sixteen count. The divide-by-sixteen retiming clock from divider 218 assumes the function of shifting data into shift register 210 and clocking the data into encoder 220. At the encoder 220, the data is both re-encoded and retimed in Manchester code format, from whence it is coupled to transmitter 222. Of course, data encoded in other formats would be re-encoded in the original code.

As previously described, the data is in ON/OFF character synchronous format, hence for retransmission, the transmitter drivers are clamped OFF during intervals when no data is transmitted by a signal originating from synch detector 212 and the 44-bit counter 216. When the re-encoded data is ready for transmission, the 44-bit counter begins counting until the count of 44 is reached, whereupon the transmitter 222 is clamped OFF and the synch counter circuits are reset. Data from transmitter 222 is transformer coupled onto the transmission line.

Figure 3:
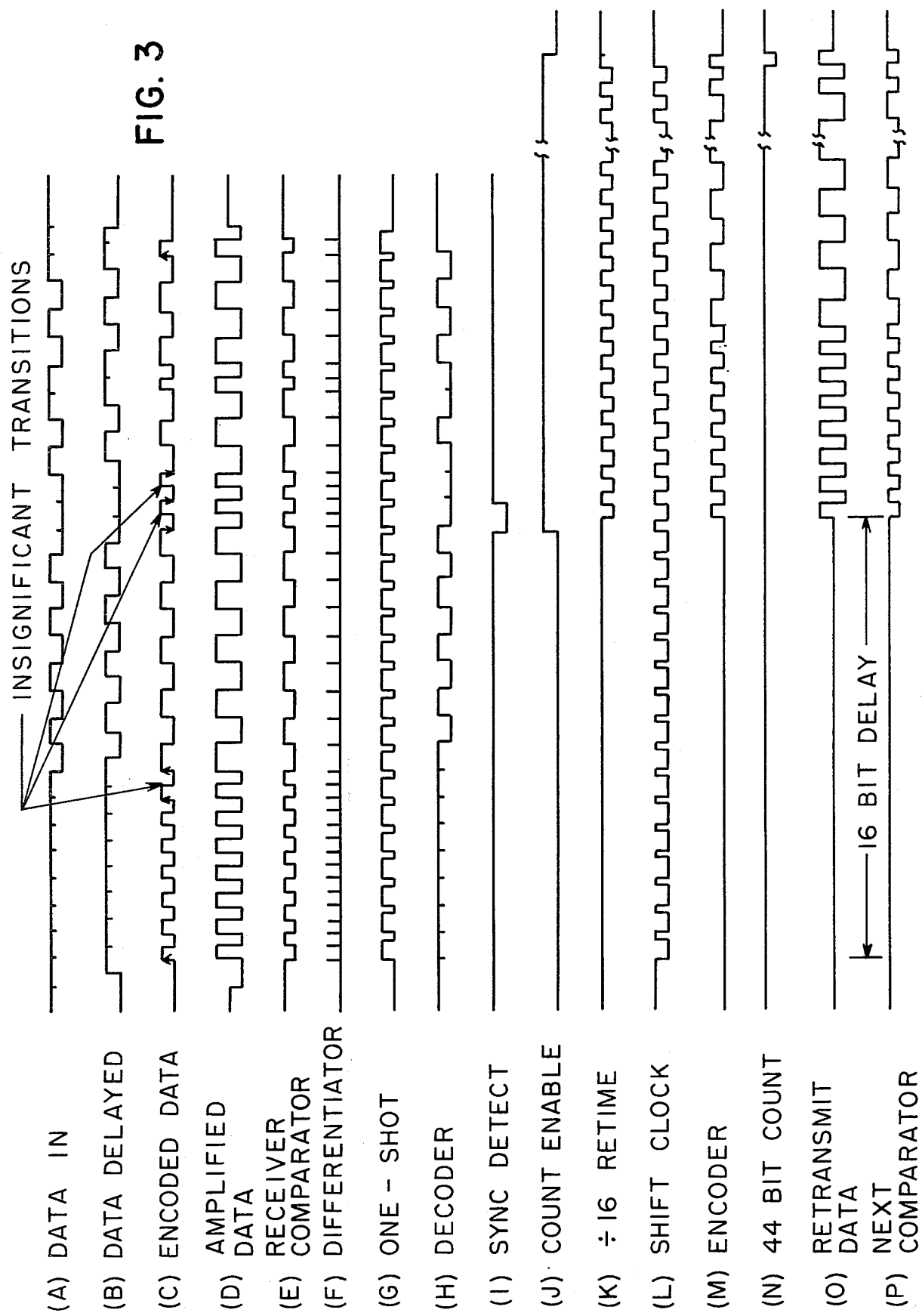
FIGS. 3(A) through 3(P) are various waveform diagrams illustrative of the retiming operation of the retiming circuit described with reference to FIG. 2.

Referring now to the waveform diagrams of FIGS. 3(A) through 3(P), the various waveforms illustrative of the operation of the retiming circuit of FIG. 2 are shown. FIG. 3(A) illustrates the incoming unencoded data within the terminals wherein at least four (eight are shown) logical "ones" in the preamble are defined prior to the synch character. FIG. 3(B) shows the data of FIG. 3(A) delayed as it appears at the encoder 220. The actual Manchester encoding, shown by FIG. 3(C) illustrates the certain of the significant transitions (indicated by arrows) and the insignificant transitions which should not be detected and are accordingly blanked out. FIG. 3(D) illustrates the encoded data of FIG. 3(C) after amplification as it would appear on the transmission line. FIG. 3(E) illustrates the receiver comparator 202 output, pulse train which is attenuated and inverted and illustrative of the Manchester format. FIG. 3(F) shows the output of differentiator 204, a voltage spike at each zero-crossing. FIG. 3(G) shows the output pulses from one-shoot 206, the data clocking signal. Since one-shot 206 is non-retriggerable by the insignificant transitions, which occur in each instance before the 600 nanosecond pulse time, the insignificant transitions are effectively blanked, which condition is apparent from a comparison of waveform 3(C) with waveform 3(G). The decoded Manchester data is shown by waveform 3(H), although somewhat additionally delayed from the data of waveform 3(B). When synch detector 212 detects the 4-bit preamble and the 8-bit synch character, the output waveform shown by FIG. 3(I) is coupled therefrom, which is illustrative of the detection of the correct 12-bits of preamble and synch character out of the 16-bits contained in shift register 210. The count enable signal 3(J) is generated in response to a valid synch character detection. Thus, the decoding of the correct predetermined number and sequence of data bits (preamble and synch character) causes the enabling signal to be generated. The count enable 3(J) switches ON the divide-by-16 circuit 218, shown by FIG. 3(K), which begins clocking data into shift register 210 and into encoder 220, as shown by waveform 3(L), which waveform is both sharply defined and substantially noise free, as it is newly generated, i.e. has not been propagated over the transmission line. The reencoded data shown by FIG. 3(M) coupled from encoder 220 is transmitted until the 44th-bit counted by counter 216 and shown by waveform 3(N) is reached, which clamps OFF the transmitter and resets the synchronizing circuits. Waveform 3(O) illustrates the encoded data of FIG. 3(M) after amplification at the transmitter. Line jitter and noise are effectively eliminated by the system. FIG. 3(P) shows a typical input which might be received at the central processor or another repeater after retransmission of the first 42-bit character, as the repeater functions in a multi-terminal environment.

Figure 4:
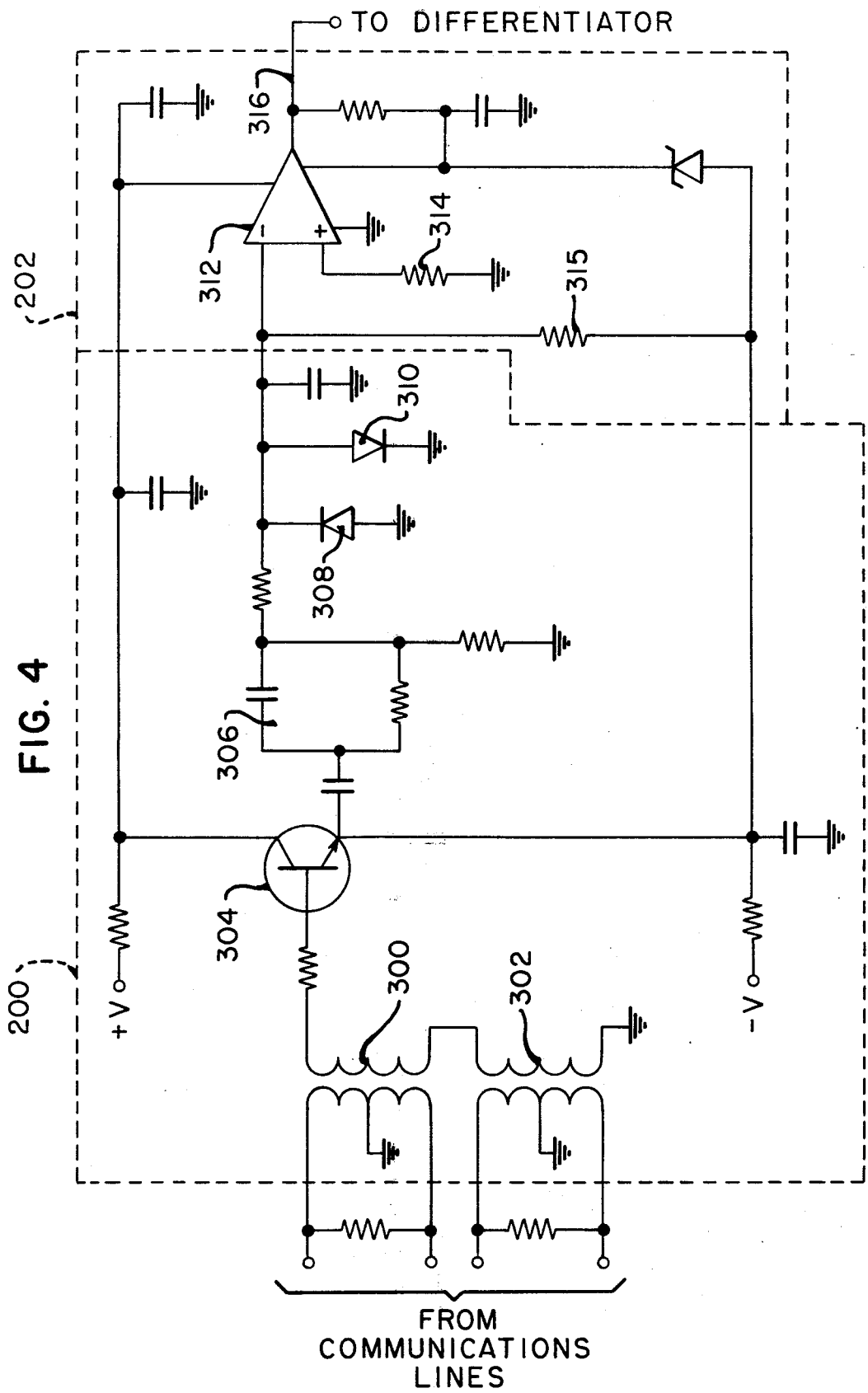
FIG. 4 is a schematic diagram of a receiver utilized in connection with the invention.

Referring now to FIG. 4, a suitable equalizer 200 and differential comparator 202 are shown schematically. Data signals in ON/OFF format from the terminals are transformer coupled via either one of two transformers, 300 and 302, one from the main communication line and one from a branch line, if desired, to the receiver. The internal terminations are chosen to match the characteristic impedance of the line with or without a branch connection. The transformer coupled data input signal is buffered by a transistor emitter follower 304, capacitively coupled to a band pass filter 306, and maintained at an equalized amplitude. Diodes 308 and 310 provide protection for comparator 312. The input to differential comparator 312 is biased by resistor 315 to provide an offset threshold for immunity against background noise and to compensate for dissymmetry introduced by the comparator output coupling into a TTL input. The zero-volt reference of comparator 312 is grounded through resistor 314, providing the zero crossing detection threshold of the bi-polar input thereto, the output of which comparator is coupled out on line 316 to differentiator 204.

Figure 5A:
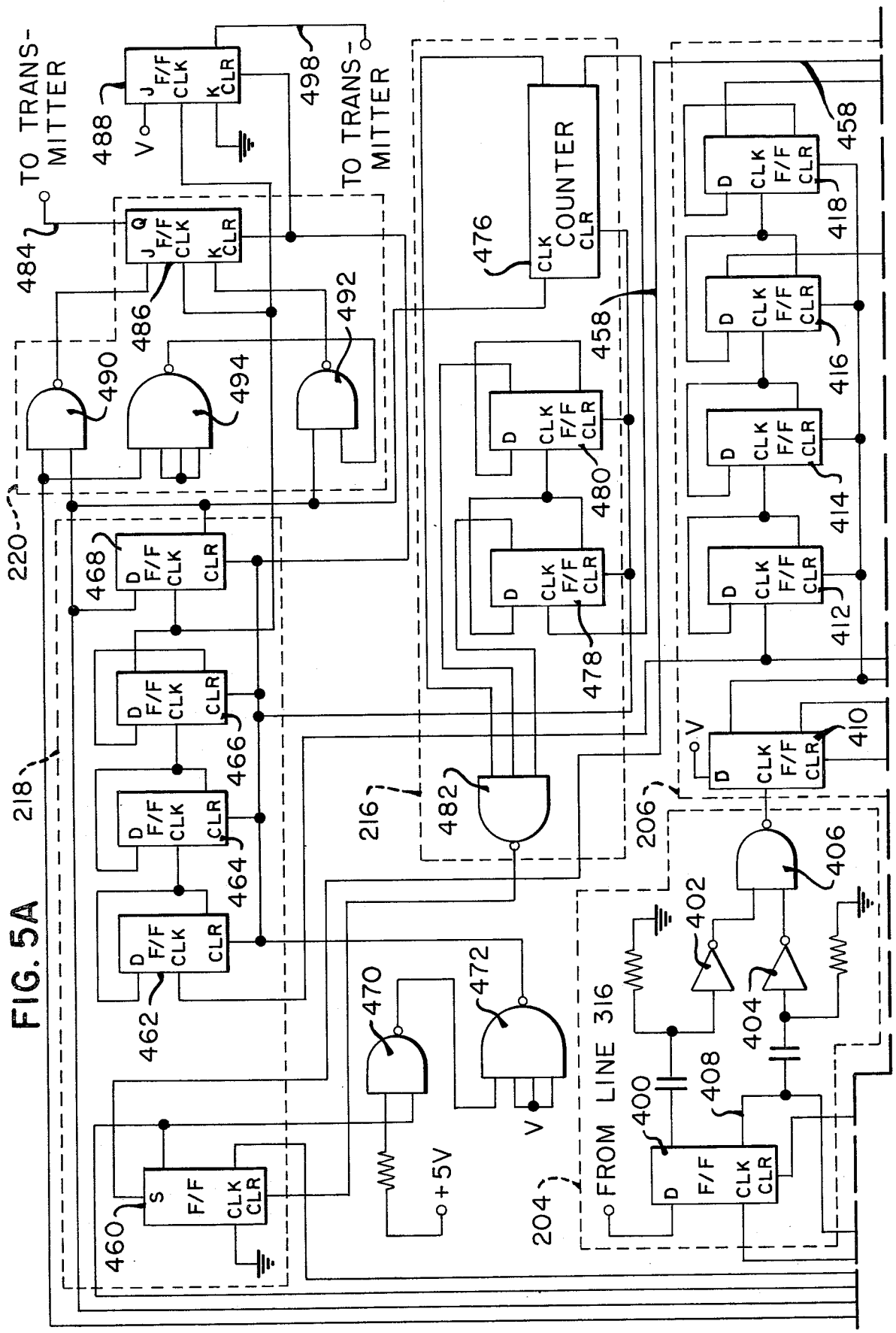
FIG. 5A and 5B is a single logic diagram showing the circuit described with reference to FIG. 2 in greater detail.
Figure 5B:
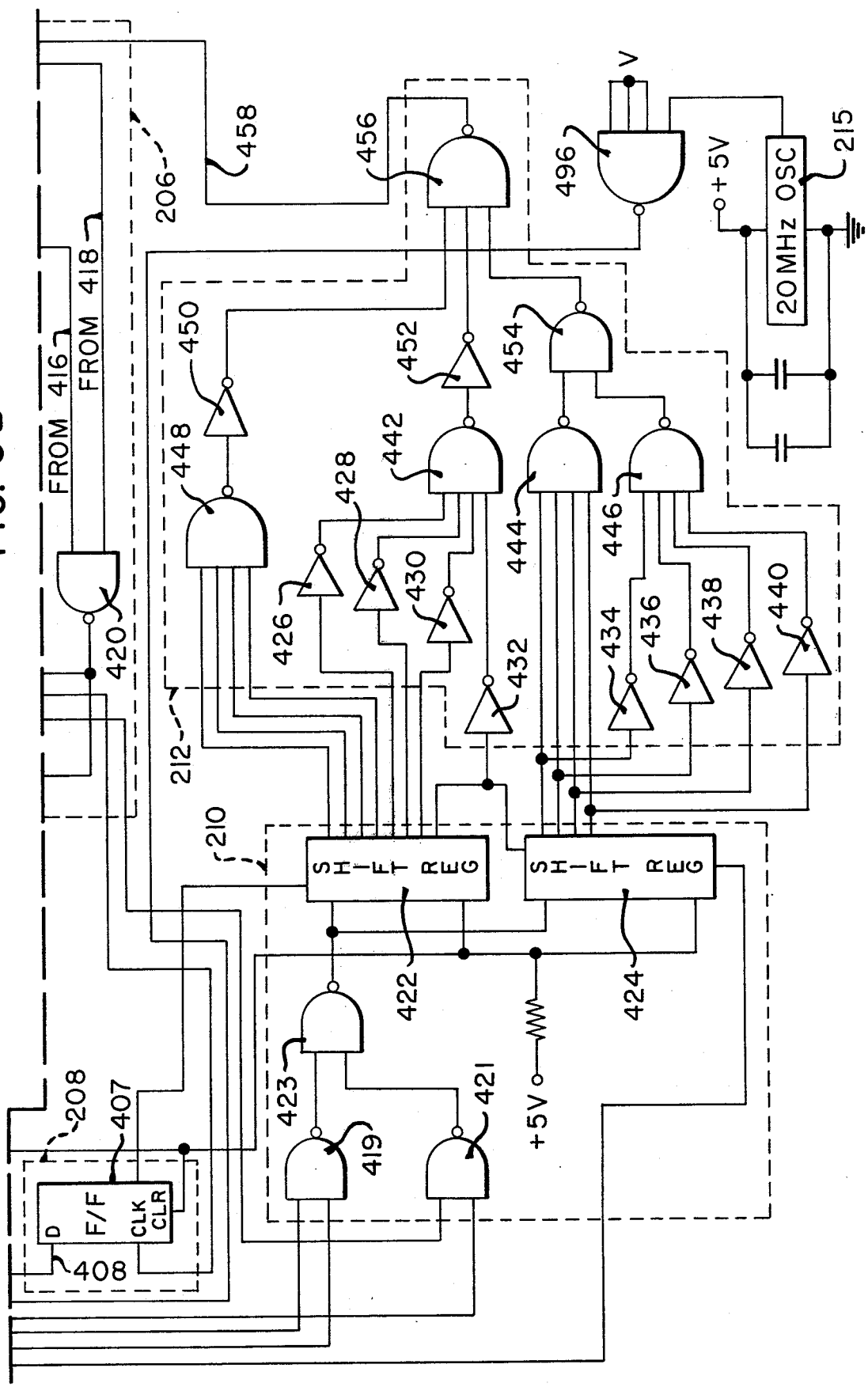

Referring now to FIGS. 5(A) and 5(B), a detailed logical schematic of the retiming circuit described with reference to FIG. 2 is illustrated. The schematics of FIGS. 5(A) and 5(B) are connected where illustrated by the heavy dotted lines. While a variety of logic design implementations are possible, the illustrated implementation serves to minimize the number of required components.

The output of comparator 312 on line 316 is coupled to differentiator 204 which is comprised of a dual-D flip-flop 400 having complementary outputs coupled to a pair of hexinverters 402 and 404 respectively, the outputs of which hexinverters comprise the two inputs to a quad 2-input NAND gate 406. The comparator 312 output is also coupled to decoder 208, which is a dual-D flip-flop 407 via line 408 from flip-flop 400. The output of differentiator 204 NAND gate 406 is coupled to the 600-nanosecond non-retriggerable one-shot 206, which one-shot 206 is comprised of five dual-D flip-flops 410, 412, 414, 416, and 418 which provide the 600 nanosecond output pulse width applied to one-shot output quad 2-input NAND gate 420. The data is decoded as previously described by sampling the comparator output with the leading edge of the one-shot 206 output pulse by detector 208 flip-flop 407. The decoded data is then clocked into the 16-bit shift register 210 from detector flip-flop 208 by the one-shot output pulses with internal clock pulse gating provided by NAND gates 419, 421 and 423. Shift register 210 is comprised of a pair of 8-bit serial-to-parallel converters 422 and 424 from which shift register the synch detect signal is generated when the appropriate 12-bits of preamble and synch character are contained therein, which synch detect signal is coupled via the shift register output gating to synch detector 212 when the input gating of synch detector 212 has applied thereto the appropriate 12 bits. Synch detector 212 is comprised of eight hex-inverters 426 through 440, each having an output coupled to one of three dual 4-input buffer gates 442, 444 and 446. Another dual 4-input buffer gate 448 has directly coupled thereto data from serial-to-parallel converter 422. The outputs from the buffer gates are reinverted by hex-inverters 450 and 452 and NAND gate 454 and are NAND'ed by the inverting NAND gate 456 to derive the synch detector output which causes the generation of the count enable signal. The synch detect signal is coupled via line 458 to the retiming clock which includes divide-by-eight and divide-by-16 circuits 214 and 218, and are, for simplicity of description, indicated by numeral 218 in FIG. 5. The 20 MHz output of oscillator 214 is divided by the retime clock to a 1.25 MHz and 2.5 MHz signal to assume the task of shifting data into shift register 210 once enabled instead of the one-shot output data clock as previously described. The divide-by-eight and divide-by-16 retiming clock 218 are comprised of an input dual-D flip-flop 460 and four additional dual-D flip-flops 462, 464, 466 and 468, each providing an additional binary division step. Internal gating within the retime clock between input flip-flop 460 and the binary divide-by-two flip-flops 462 through 468 is provided by NAND gate 470 and dual 4-input buffer 472. The counter enable signal also enables the 44-bit counter 216 as previously described, within which count of fourty-four, data characters are readied for transmission. The 44-bit counter 216 is comprised of a synchronous four-bit counter 476 and a pair of dual-D flip-flops 478 and 480 for providing gating into the 44-bit counter output inverting NAND gate 482. The encoder 220, as previously described, uses the divide-by-sixteen and divide-by-eight counts to re-encode and retime the data into Manchester format before coupling the data to the transmitter via line 484 at the 1.25 MHz frequency. Encoder 220 to which the output of shift register 210 is coupled for re-encoding comprises a pair of dual JK edge triggered flip-flops 486 for re-encoding and 488 for transmitter clamping with with input gating thereto from the retiming clock being provided by a pair of two input NAND gates 490 and 492 and a dual four input buffer 494. The 20 MHz oscillator 124 rather than being coupled directly to the respective circuits previously described, is first buffered by a dual four input buffer 496.

Figure 6:
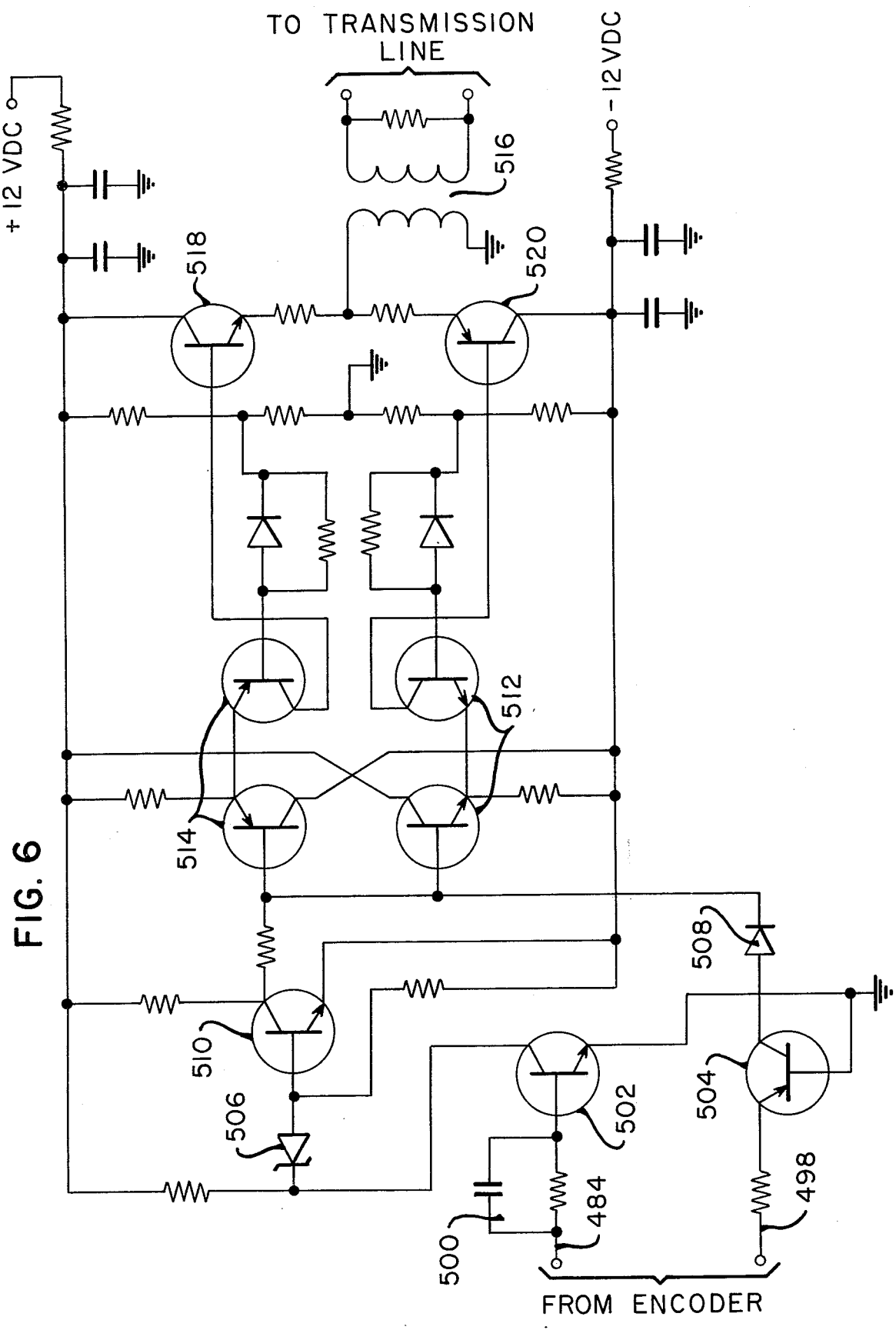
FIG. 6 is a schematic diagram of a transmitter utilized in connection with the invention.

Referring now to FIG. 6, a transmitter 222 suitable for retransmission of the retimed data coupled thereto via lines 484 and 498 from the encoder 220 is shown. The retimed Manchester encoded data is coupled via input biasing circuit 500 and clamped to a neutral lead during periods of no transmission, due to the ON/OFF type data format, by transistors 502 and 504 and diodes 506 and 508. After level conversion by a transistor 510, the retimed data is buffered by differential amplifiers comprised of transistors 512 and 514 and is then transformer coupled to the transmission line via transformer 516 after coupling thereto from the bi-polar drivers by a pair of complementary followers 518 and 520. Appropriate reference voltages for the differential amplifiers are provided by the illustrated resistance and diode networks.

Figure 7:
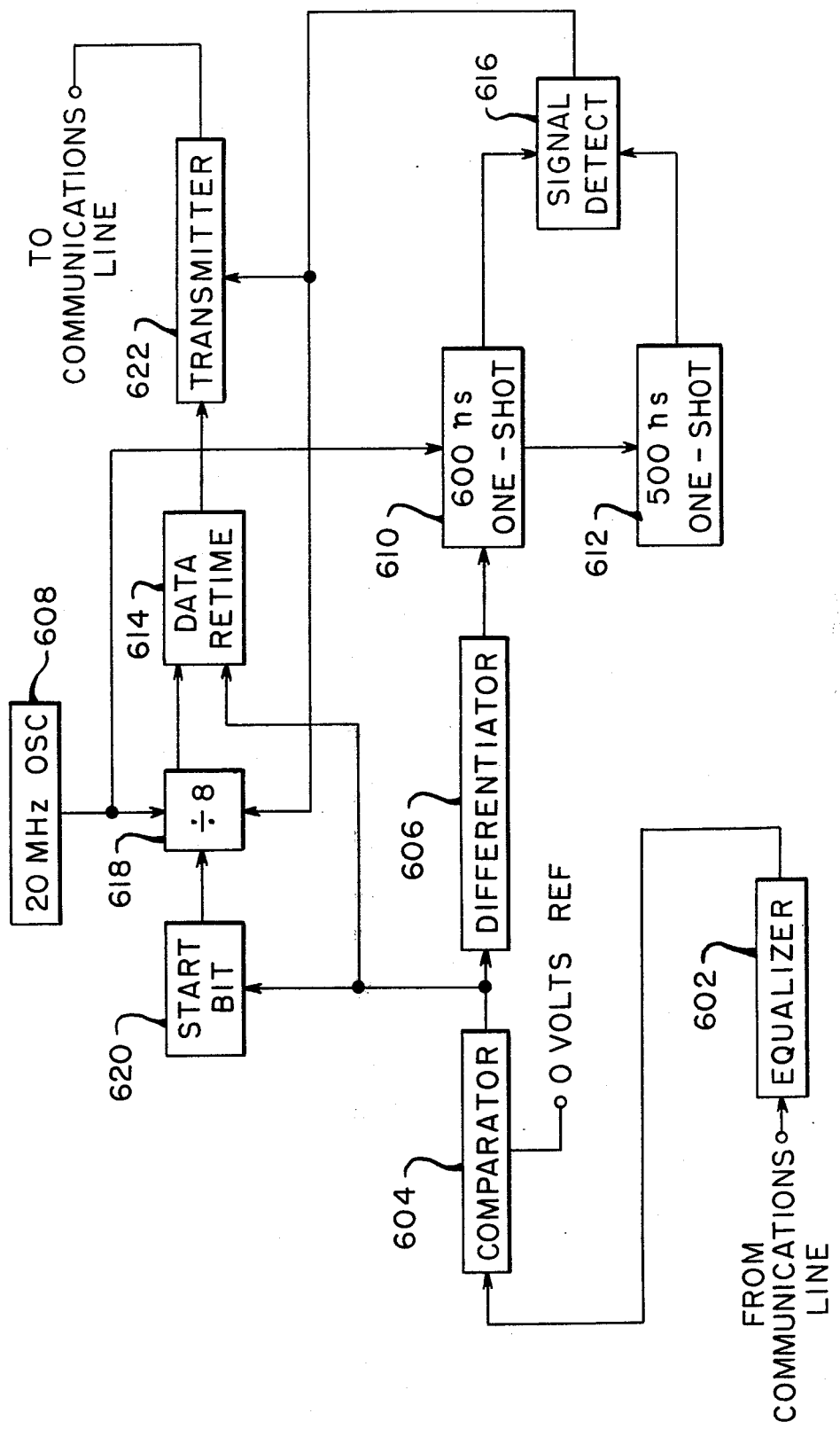
FIG. 7 is a block diagram of an alternative embodiment of the invention.

Referring now to FIG. 7, an alternative embodiment of the invention is illustrated in block diagram form. The circuit operation is similar to the operation of the circuit heretofore described with reference to FIG. 2 with the primary difference; however, being that incoming data start bits rather than an entire synchronization character are utilized to initiate the retiming operation, character by character. Additionally, the retimed data is not decoded and then reencoded but rather is merely detected and retimed. While this embodiment offers a circuit simplification, it is somewhat more susceptible to noise and/or other transition line anomalies than the aforedescribed embodiment, however, a retimed data signal over an extended length transmission line is also provided between the terminals and the central processor. Typically, the incoming transmission line distortion is in the range of five to ten percent peak shift.

Incoming data from the transmission line is amplitude equalized by an equalizer 602 to compensate for the frequency attenuation characteristics of the transmission line in similar manner as by the equalizer described with reference to FIG. 2, and includes a low-pass filter for reduction of out-of-band noise. An integrated circuit comparator 604 provides an output to differentiator 606 indicative of the Manchester encoded transitions. Comparator 604 and differentiator 606 are configured substantially identically to the comparator 202 and differentiator 204 described with reference to FIG. 2. The output of differentiator 606 is clocked by a 20-MHz local oscillator 608 to provide one-shot triggering pulses coincident with zero crossings of the Manchester data for triggering a one-shot 610 having an output pulse width of approximately 600 nanoseconds. Additionally, the receiver comparator 604 output is clocked through a D-type flip-flop having complementary data outputs which are differentiated to obtain the aforedescribed triggering pulses. One-shot 610 is digitally implemented and monretriggerable (for blanking out the insignificant Manchester transitions) with the output pulse duration being sufficient to accomplish the blanking function. The trailing edge of the output pulses from digital one-shot 610 triggers a second digital one-shot 612 having an output pulse width of approximately 500 nanoseconds. The timing of the two one-shots is such that the trailing edge of the second digital one-shot output is caused to occur at the midpoint of the 600 nanosecond output pulse from digital one-shot 610 and this trailing edge of digital one-shot 612 is used to sample the output of one-shot 610 to provide a direct indication of the presence or absence of a carrier.

The timing recovery technique essentially comprises detection of a start bit of an incoming data character, division of the 20 MHz local oscillator by eight, and reclocking the comparator output with the derived 2.5 MHz clock. Assuming first that there is no signal on the transmission line, the receiver comparator 604 output will maintain a steady logical "one" state and the 2.5 MHz retiming counter 614 will be clamped off. When comparator 604 detects the start bit signal on the line, the initial transition, i.e., the start bit, is used to enable the 2.5 MHz counter at a point approximately one quarter of a bit period into the first bit time, at which time a check is made to determine if the transition detected by comparator 604 represented a legitimate start bit. This is accomplished by signal detector 616, a dual-D flip-flop which essentially compares the outputs of one-shot 610 and 612 to insure that the transition has occurred at its appropriate interval in time and which flip-flop couples an inhibit signal to the divide-by-eight circuit 618 when the start bit is noise or jitter rather than data. The start bit detector 620 may comprise, for example, either a retriggerable flip-flop such as a dual-D or JK flip-flop enabled as aforedescribed by the output of comparator 604. Assuming the detection of a legitimate start bit, counter 614 in response to the divide-by-eight circuit 618 generates the 2.5 MHz retiming clock which operates in combination with the signal detect circuit 616 to control the transmitter 622 clamp, as it is critical that the ON and OFF transitions of the clamping signal during periods of signal transmission be coincident with transitions in the encoded data as previously described. During retransmission, the bi-polar drivers of transmitter 622 are clamped to neutral level during periods of no transmission which serves to prevent bias distortion associated with the circuit time constants. Thus, the signal detector circuit 616 monitors the receiver and indicates the presence or absence of a carrier. Transmitter 622 level convers the Manchester encoded retimed data coupled thereto and transformer couples the data to the transmission line via complementary emitter followers. Of course, the data may be transmitted at any desired frequency and it is to be understood that 1.25 MHz is an exemplary frequency only, which frequency is commonly used for the transmission of digitally encoded data where Manchester, NRZI or other encoding is commonly employed.

While the invention has been shown and described with reference to a preferred embodiment thereof, it will be understood that persons skilled in the art may make modifications thereto without departing from the spirit and scope of the invention as defined by the claims appended hereto.

What is claimed is:

1. A timing recovery circuit for synchronizing digitally encoded asynchronous data with a retiming clock in a data communications channel, comprising:
   means for detecting transitions in said data and for deriving a data clocking signal in substantial coincidence therewith;
   means responsive to said data clocking signal for decoding said data;
   means for deriving an enabling signal in response to the decoding of a predetermined number and sequence of data bits;
   means for generating a data retiming clock;
   means for re-encoding said data for retransmission; and
   data transfer means for coupling data from said decoding means to said transfer means with said data clocking signal prior to the generation of said enabling signal and from said transfer means to the encoder with the retiming clock after the generation of said enabling signal.

2. A timing recovery circuit in accordance with claim 1, wherein said communications channel comprises a transmission line and further comprising:
   transmitter means for retransmitting said re-encoded data along said transmission line.

3. A timing recovery circuit in accordance with claim 2, further comprising:
   digital counter means initiated by said enabling signal for counting a predetermined number of retransmitted data bits, after which count said transmitter is turned off.

4. A timing recovery circuit in accordance with claim 1 wherein said means for detecting data transitions includes a zero-crossing detector.

5. A timing recovery circuit in accordance with claim 4 wherein said zero-crossing detector includes a differentiation means for generating a pulsed output in coincidence with the zero-crossings of said data.

6. A timing recovery circuit in accordance with claim 5 further including:
   pulse generator means triggered by the pulsed output of said differentiation means for generating said data clocking signal.

7. A timing recovery circuit in accordance with claim 6 wherein said data is phase encoded data having significant and insignificant transitions.

8. A timing recovery circuit in accordance with claim 7 wherein said pulse generator means comprises a non-retriggerable digital one-shot circuit and wherein the pulse width of said data clocking signal is sufficient to blank the insignificant transitions of said phase encoded data.

9. A timing recovery circuit in accordance with claim 2 wherein said predetermined number of data bits is equal to or greater than the number of bits in a single data character preamble.

10. A timing recovery circuit in accordance with claim 9 wherein said retransmitted data is character synchronous.

11. A timing recovery circuit in accordance with claim 8 wherein said data transfer means comprises a shift register, and wherein the leading edge of said data clocking signal clocks decoded data into said register.

12. A timing recovery circuit in accordance with claim 1 wherein said predetermined number of decoded data bits is the total number of bits in a character preamble and synchronization character and wherein said predetermined sequence of decoded data bits comprises the encoding of said synchronization character.

13. A timing recovery circuit in accordance with claim 12 wherein said shift register is at least an N-bit register, where N is equal to or greater than the sum of the number of data bits in said character preamble and in said synchronization character.

14. A timing recovery circuit in accordance with claim 2 wherein said means for generating a retiming clock comprises:
stable oscillator means for generating a stable clock at a frequency which is substantially greater than the frequency of said retiming clock; and
frequency division means enabled by said enabling signal for dividing down said stable clock frequency to the retiming clock frequency.

15. A timing recovery circuit in accordance with claim 14 wherein said re-encoding means is clocked by the output of said frequency division means.

16. A digital repeater for insertion into a data transmission line for retiming and retransmitting asynchronous digitally encoded data comprising:
means for detecting said data and for deriving a data clocking signal in coincidence with said detected data;
means responsive to said data clocking signal for decoding said data;
means for generating an enabling signal in response to the decoding of a predetermined portion of said data;
means for deriving a retiming clock;
means for encoding said data; and
data transfer means for clocking data from said decoder to said transfer means with said data clocking signal prior to the generation of the said enabling signal and from said transfer means to said encoder at the retiming clock frequency subsequent to the generation of said enabling signal such that said reencoded data is retransmitted in synchronization with said retiming clock.

17. A digital repeater in accordance with claim 16 wherein said predetermined portion of said data comprises a particular number and sequence of data bits.

18. A digital repeater in accordance with claim 17 further comprising:
means initiated by said enabling signal for counting at least the number of bits contained in a complete data character, after which count the retransmission of data is stopped.

19. A digital repeater in accordance with claim 18 wherein said detecting means comprises a zero-crossing detector including means for generating a train of pulses coincident with the zero-crossings of received data.

20. A digital repeater in accordance with claim 19 further including:
means triggered by said pulse train for generating said data clocking signal.

21. A digital repeater in accordance with claim 20 wherein said means for generating said data clocking signal comprises a non-retriggerable digital one-shot circuit and wherein said received data is phase encoded data having significant and insignificant data transitions included within each data bit period and wherein the data clocking signal is of sufficient pulse width to blank said insignificant transitions.

22. A digital repeater in accordance with claim 19 wherein said data transfer means comprises a shift register and wherein the leading edge of said data clocking signal clocks decoded data into said shift register.

23. A digital repeater in accordance with claim 16 wherein said predetermined data code consists of the total number of bits in a character preamble and in a synchronization character.

24. A digital repeater in accordance with claim 18 wherein said means for generating a retiming clock comprises:
stable oscillator means for generating a clock at a frequency which is at least a multiple of said retiming clock frequency; and
frequency division means enabled by said enabling signal for dividing down said stable clock frequency to the retiming clock frequency.

25. In a data communications system for asynchronously transmitting digitally encoded data between a plurality of peripheral devices and a data processor over an extended length transmission line, including one or more retiming circuits at one or more locations along the transmission line, each of said retiming circuits comprising:
means for detecting said data and for deriving a data clocking signal in coincidence with said detected data;
means responsive to said data clocking signal for decoding said data;
means for generating an enabling signal in response to the decoding of a predetermined portion of said data;
means for deriving a retiming clock;
means for encoding said data; and
data transfer means for clocking data from said decoder to said transfer means with said data clocking signal prior to the generation of the said enabling signal and from said transfer means to said encoder at the retiming clock frequency subsequent to the generation of said enabling signal such that said reencoded data is retransmitted with said retiming clock.

26. In a data communications system in accordance with claim 25, a retiming circuit comprising:
means initiated by said enabling signal for counting at least the number of bits contained in a complete data character after which count the retransmission of data is stopped.

27. In a data communications system in accordance with claim 26, a retiming circuit comprising:
a zero-crossing detector including means for generating a train of pulses coincident with the zero-crossing of received data.

28. In a data communications system in accordance with claim 27, a retiming circuit further including:
means triggered by said pulse train for generating said data clocking signal.

29. In a data communications system in accordance with claim 28, a retiming circuit further comprising:
a non-retriggerable digital one-shot circuit having said pulse train coupled thereto, and having an output and wherein said received data is phase encoded data having insignificant transitions included within each data bit period; and
wherein the one-shot output pulse width is sufficient to blank said insignificant transitions.

30. In a data communications system in accordance with claim 28, a retiming circuit further comprising:

a shift register wherein the leading edge of said data clocking signal clocks decoded data into said shift register.

31. In a data communications system in accordance with claim 30, a retiming circuit wherein said predetermined portion comprises the total number of bits in a character preamble and synchronization character for each character.

32. In a data communications system in accordance with claim 30, a retiming circuit further comprising:
stable oscillator means for generating a stable clock at a frequency which is an integral multiple of said retiming clock frequency; and
frequency division means enabled by said enabling signal for dividing down said stable clock to the retiming clock frequency.

33. An asynchronous modem comprising:
means for receiving digitally encoded data in a communications channel and for deriving a first data clock in phase with said received data;
means responsive to said first data clock for decoding said data;
means for generating an enabling signal in response to the decoding of a predetermined portion of said data;
means for generating a second data clock at the same frequency and out of phase with said first data clock;
means for re-encoding said data;
data transfer means for clocking data thereto from said decoder with said first data clock prior to the generation of said enabling signal and from said transfer means with said second data clock subsequent to the generation of said enabling signal to said re-encoding means; and
means for retransmitting said retimed and re-encoded data into said communications channel.

34. An asynchronous modem in accordance with claim 33 wherein said communications channel is a transmission line and wherein said predetermined portion of said data includes the preamble and synchronization character portion of each data character.

35. An asynchronous modem in accordance with claim 34 further comprising:

digital means actuated by said enabling signal for counting a number of data bits at least equal to the number of data bits in a data character, and for turning said retransmitting means off when said number is counted.

36. An asynchronous modem in accordance with claim 35 wherein said digitally encoded data is phase encoded and further including:
means for blanking the insignificant transitions of said phase encoded data.

37. An asynchronous modem in accordance with claim 35 wherein said data transfer means comprises a shift register.

38. A timing recovery circuit for synchronizing digitally encoded asynchronous data with a retiming clock in a data communications channel, comprising:
means for detecting transitions in said data and for deriving a data clocking signal in coincidence therewith;
means responsive to said data clocking signal for detecting one or more start bits of said data;
means for deriving an enabling signal in response to the detection of said data start bits;
means for generating a data retiming clock;
means for comparing said data transitions time with a reference time for generating an output signal indicative of valid data;
transmitter means gated on by said valid data signal for transmitting said data with the retiming clock; and
means responsive to said enabling signal and to said valid data signal for gating said data to said transmitter with said retiming clock only after the generation of said enabling signal and in the presence of said valid data signal.

39. A timing recovery circuit in accordance with claim 38 wherein said start bits comprise:
the first data bit of each incoming data character and wherein said enabling signal generation coincides with the detection of the start bit.

40. A timing recovery circuit in accordance with claim 39 wherein said comparing means includes:
means for sampling the data bit stream at approximately the mid-bit locations therein.

* * * * *